United States Patent [19]

Marshall et al.

[11] Patent Number: 4,642,007
[45] Date of Patent: Feb. 10, 1987

[54] PALLETIZED CYLINDER DISTRIBUTION SYSTEM

[75] Inventors: Michael S. Marshall, Shoemakersville; Vernon R. Ingham, Phoenixville, both of Pa.

[73] Assignee: MG Industries, Valley Forge, Pa.

[21] Appl. No.: 717,852

[22] Filed: Mar. 29, 1985

[51] Int. Cl.⁴ ............................................. B62D 23/00
[52] U.S. Cl. ...................................... 410/78; 410/80; 296/182; 296/183
[58] Field of Search .................. 410/77–81; 296/182, 183; 414/343, 340, 347, 498, 341, 286

[56] References Cited

U.S. PATENT DOCUMENTS

| | | | |
|---|---|---|---|
| 1,252,810 | 1/1918 | Kirchner | 410/77 |
| 1,470,266 | 10/1973 | Kirchner | 410/79 |
| 2,763,383 | 9/1956 | McCoy | 414/542 |
| 3,059,592 | 10/1962 | Cozzoli | 410/77 X |
| 3,159,111 | 12/1964 | Gutridge et al. | 410/79 |
| 3,734,315 | 5/1973 | James | 414/281 |
| 3,934,924 | 1/1976 | Bennett | 410/80 |
| 3,993,344 | 11/1976 | Bennett | 410/36 |
| 4,165,806 | 8/1979 | Cayton | 706/386 |
| 4,231,695 | 11/1980 | Weston, Sr. | 410/79 X |
| 4,295,431 | 10/1981 | Stavlo | 108/55.1 |
| 4,325,669 | 4/1982 | Schafer | 414/786 |
| 4,462,746 | 7/1984 | Smets | 414/330 |

FOREIGN PATENT DOCUMENTS 2066166 7/1981 United Kingdom .................. 410/78

Primary Examiner—Robert B. Reeves
Assistant Examiner—Glenn B. Foster
Attorney, Agent, or Firm—William H. Eilberg

[57] ABSTRACT

A palletized cylinder distribution system facilitates the transportation and distribution of gas cylinders. The system includes a network of members and cross members, this network being mounted on the rear of a truck. A walkway is disposed on the network, the walkway dividing the network into at least two regions. The surface of the walkway is raised from the level of the network. Pallets of gas cylinders are placed on the network, forming rows on either side of the walkway. The pallets have base portions which include laterally extending tabs. The tabs hold the pallets in place by engagement with a flange defined by the walkway, and with another flange disposed on side rails attached to the network, on the other side of the pallet. The truck has no flatbed of its own; the bases of the pallets, together with the surface of the walkway, define the bed of the truck. Access to the cylinders is obtained through the walkway. Cylinders containing a desired type of gas can be rapidly retrieved without the need for rearrangement of the other cylinders. Whole pallet loads of cylinders can also be easily handled with the invention. The invention further includes a method of delivering gas cylinders in large or small quantities.

5 Claims, 6 Drawing Figures

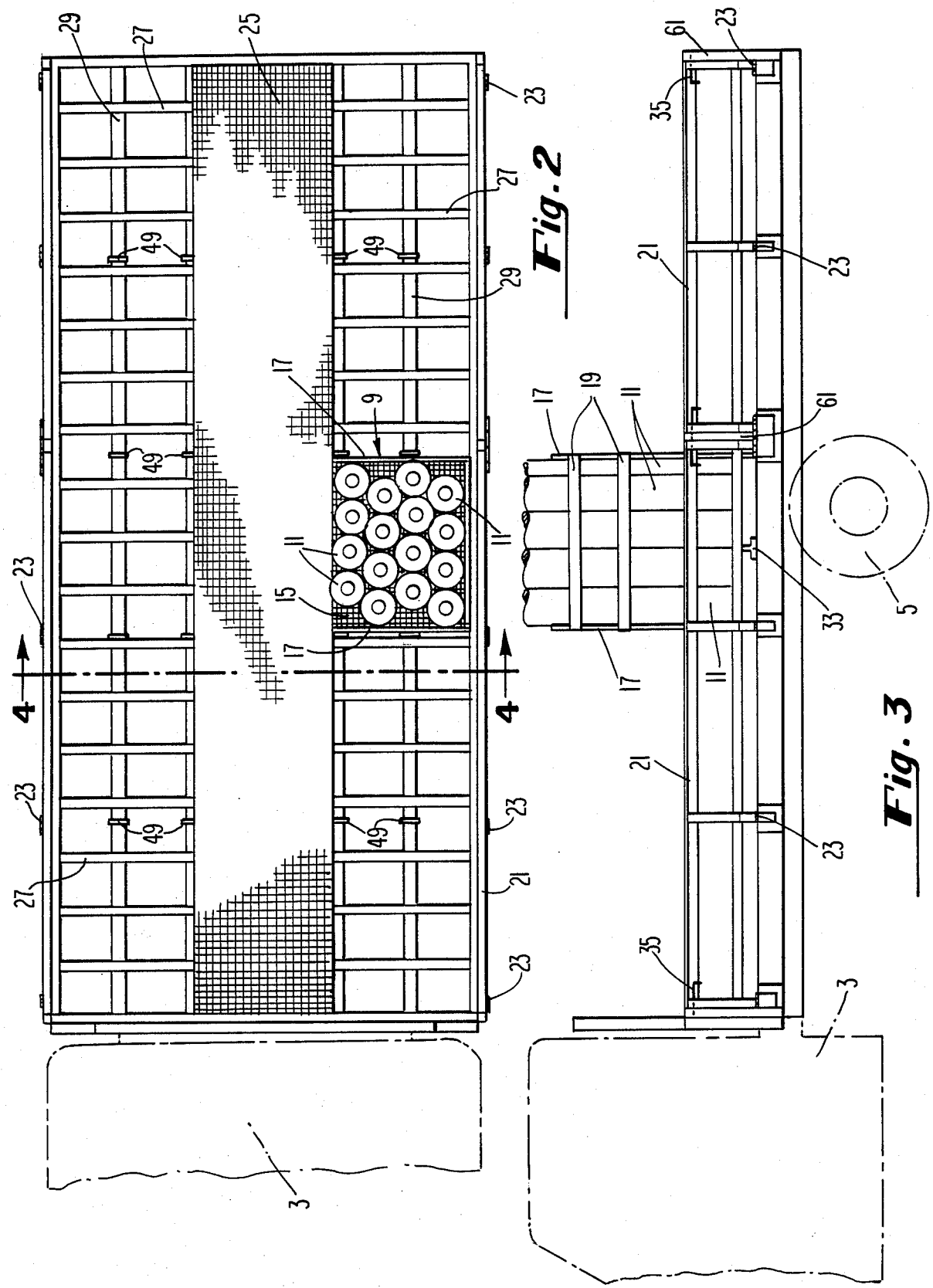

PALLETIZED CYLINDER DISTRIBUTION SYSTEM

BACKGROUND OF THE INVENTION

The present invention relates to the field of transportation and distribution of gas cylinders, in both large and small quantities.

Pressurized cylinders have long been used for storage of specialized industrial gases. These cylinders are typically filled with gases such as oxygen, propane, acetylene, argon, nitrogen, or others. The cylinders are generally filled with the gas before delivery to a customer. After the gas is consumed, the cylinders are returned to the gas supply outlet, and replacement cylinders are delivered. The distribution of gases therefore involves repeated loading and unloading of filled or empty gas cylinders.

Sometimes, a user of industrial gases requires gas in large quantities. At other times, as is the case for many small welding shops, only one or two cylinders will supply the needs of the shop for a reasonably long time. It is therefore necessary to handle small numbers of gas cylinders. The effort involved in handling such small quantities is magnified when, as often happens, the user of industrial gases requires small quantities of each of several different types of gas.

The prior art has taught only one way of delivering loads of gas cylinders. A flatbed truck, i.e. a truck having a generally solid, flat surface, is loaded with a plurality of cylinders, the cylinders being tightly packed on the truck bed. Cylinders containing different types of gas are generally mixed together. The cylinders are then secured by a rope or chain extending across the bed of the truck. When a customer needs a type of gas which is found only in a cylinder which was packed onto the truck at the start of the loading process, all of the cylinders which were loaded subsequently must be moved, in order to gain access to the desired cylinder. After the desired cylinder has been removed, the cylinders which were moved to make way for the first cylinder must be then be returned to their previous positions.

It is clear that the process described above is cumbersome and inefficient, especially when used to deliver small numbers of cylinders, and to deliver small quantities of each of several gases. Much of the cost of the gases is attributable to the labor required in delivering them. The prior art method described above is clearly very labor intensive.

Few attempts have been made, in the prior art, to improve the process of transportation and distribution of gas cylinders. One such attempt is represented by U.S. Pat. No. 4,295,431, which shows a pallet for holding pressurized gas cylinders. By holding the cylinders in pallets, more than one cylinder may be handled at once. The pallet includes three vertical side walls, and an open side for loading and unloading cylinders from the pallet. Another patent dealing with transportation and distribution of gas cylinders is U.S. Pat. No. 3,993,344, which shows a plurality of pallets disposed on a flatbed truck.

Other examples of the prior art include U.S. Pat. No. 2,763,383, which shows apparatus for handling cylindrical containers, including gas containers; U.S. Pat. No. 4,325,669, showing a pallet loading and unloading system; U.S. Pat. No. 4,462,746, which shows apparatus for handling palletized loads; U.S. Pat. No. 3,734,315, which discloses another means for transporting palletized loads; and U.S. Pat. No. 4,165,806, showing another palletized distrubution system.

The present invention solves the problem of transporting and distributing varying quantities of gas cylinders, using a simple and economical structure, and requiring a minimum of labor. The invention provides a method and apparatus for delivering gas cylinders, either in entire pallet loads, or individually, without the expenditure of much time or effort.

SUMMARY OF THE INVENTION

The palletized cylinder distribution system comprises a vehicle, such as a conventional truck, which is provided with a support means defined by a rectangular network of members and cross members. The network is skeletal in nature; the truck does not have its own flat-bed. A walkway, comprising a heavy-gauge metal grid, is mounted on the network, and extends substantially along its length. The walkway divides the network into at least two regions. Pallets capable of holding gas cylinders are disposed in rows in the regions adjacent the walkway. Side wails are pivotably mounted to the sides of the network, and can be raised to help secure the pallets previously loaded, or lowered, to allow access to the pallets from the side of the truck. The pallets have base portions which, together with the surface of the walkway, collectively define the bed of the truck. The base portions of the pallets have tabs, located at the corners of the base portions, the tabs being adapted for engagement with flanges on the side rails and on the walkway, as will be described below.

The walkway includes a longitudinal flange for engaging the tabs on the base of the pallet, when the pallet is pushed onto the truck and towards the walkway. The flanges on the side rails are of a construction similar to that of the flange on the walkway, so that when the side rails are raised, at least some of their flanges engage the tabs on the other side of the pallet base. Each pallet is held securely in place by at least three of its four tabs. Engagement of the tabs thus insures that the pallets will be virtually immobile while the vehicle is in motion.

According to the method of the present invention, a small number of gas cylinders (the number can be as small as one), of one type or of several different types of gas, are quickly loaded or unloaded. Each pallet is used to store a plurality of cylinders having a different type of gas. When a particular cylinder is needed, the operator walks along the walkway to the pallet which holds the cylinders of the desired gas. One or more cylinders are then removed and rolled along the walkway, and taken from the truck. Single or multiple cylinders can be loaded by reversing the above procedure.

If an entire pallet of cylinders is to be loaded or unloaded, the pallet can be handled as a unit, by a conventional fork lift truck. The pallet is designed to allow the fork member of a fork lift vehicle to pass under the surface of the pallet base, and to lift the pallet. The pallet is then loaded or unloaded from the side of the truck. Special pallet loads, comprising a predetermined assortment of gas cylinders, may be prepared in advance, so that the unloading of cylinders for customers having special needs can be further expedited.

It is therefore an object of the present invention to provide a palletized cylinder distribution system, the system being adapted for easy loading and unloading of small or large quantities of gas cylinders.

It is another object to provide a system as described above, the system being capable of handling single cylinders as well as entire pallet loads of cylinders with a minimum of time and effort.

It is another object of the invention to provide a system as described above, wherein the system maximizes access to the various cylinders by the operator of the system.

It is another object of the invention to provide a system as described above, wherein the pallets are securely held on a vehicle, while being transported.

It is another object of the invention to provide a system as described above, wherein the system includes a truck having a bed which is defined in part by the bases of the pallets.

It is another object of the invention to provide a system as described above, wherein the system accommodates different kinds of pallets.

It is another object of the invention to provide a pallet for gas cylinders, the pallet being capable of being securely mounted in a variety of pallet transportation systems.

It is another object to provide a method of loading and unloading gas cylinders, the method being suitable for either large or small quantities of cylinders.

Other objects and advantages of the invention will be apparent to those skilled in the art, from a reading of the following brief description of the drawings, the detailed description of the invention, and the appended claims.

BRIEF DESCRIPTION OF THE DRAWINGS

FIG. 2 is a partially fragmentary top view of the truck shown in FIG. 1.

FIG. 3 is a partially fragmentary side view of the truck of FIGS. 1 and 2.

DETAILED DESCRIPTION OF THE INVENTION

Figure 1:
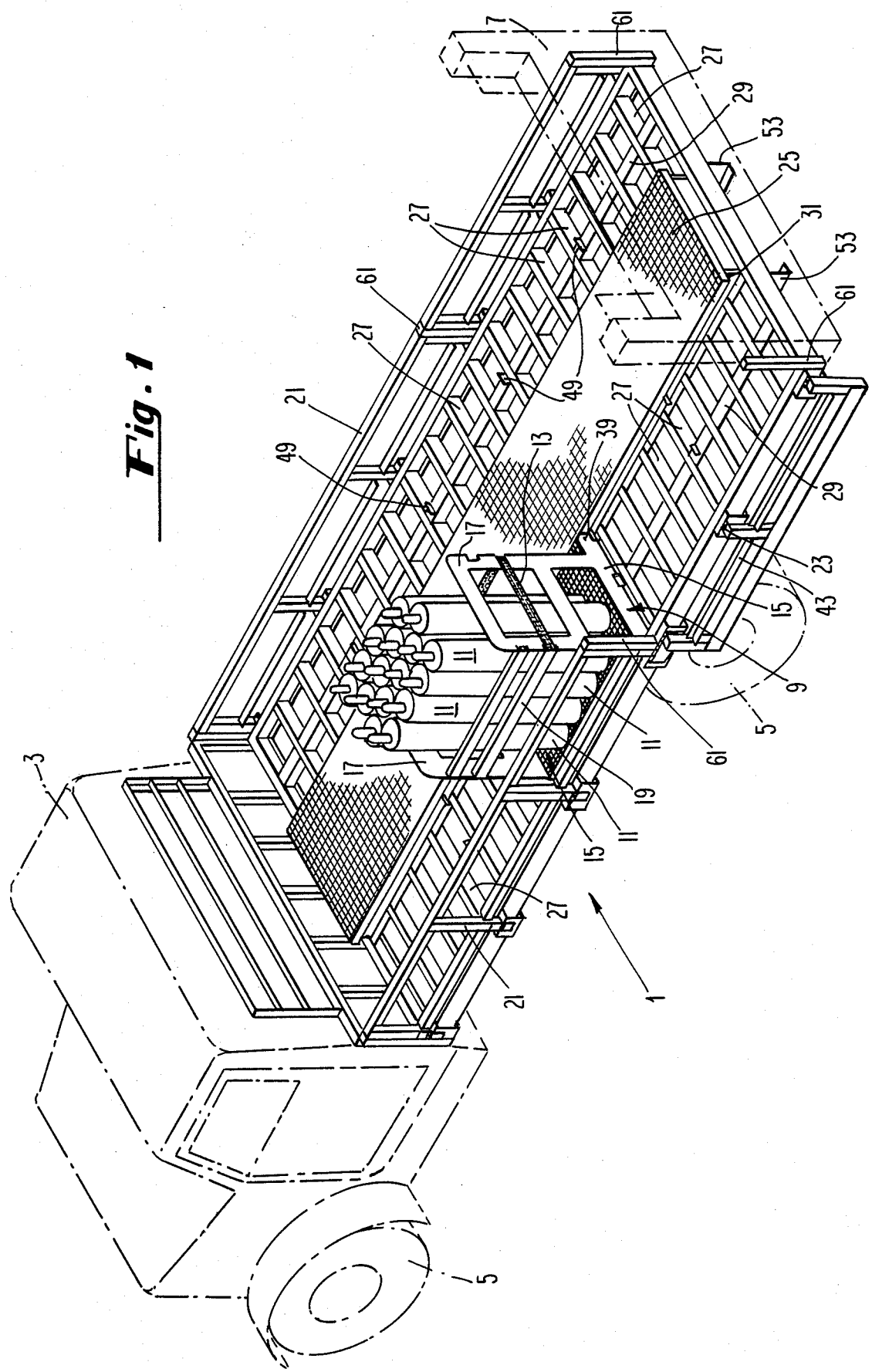
FIG. 1 is a perspective view illustrating the apparatus of the present invention, with one pallet of cylinders loaded on the truck.

The palletized cylinder distribution system of the present invention is shown in a perspective view in FIG. 1. The system comprises a specially constructed truck 1, having a conventional cab 3 and wheels 5. The truck 1 does not have a conventional bed; instead, it bears a network of longitudinal beams 29 and transverse crossbeams 27. Mounted near the center of the network of beams and crossbeams is walkway 25. Walkway 25 comprises a metal grid, of sufficient strength to enable an operator of the system to walk thereon. The metal grid of walkway 25 defines a surface which is raised relative to the level of the network. While the invention is shown in connection with a truck, it is understood that any other type of vehicle can be employed, as long as it is capable of having the disclosed structure attached thereto.

Truck 1 also comprises a conventional tailgate 7, which can be raised and lowered by conventional means, such as a hydraulic lift (not shown).

Pallet 9 is shown resting on the network of beams 29 and cross-beams 27 of the truck. Gas cylinders 11 are shown disposed on the pallet, and are held within the pallet by strap 13. Only one pallet is shown in FIG. 1, for the sake of clarity, but it is understood that, in the specific embodiment shown, ten pallets can be accommodated. Also, the invention can be used with less than a full load of pallets, because the pallets do not depend on adjacent pallets for anchoring. In the preferred embodiment, there are at least two pallets, and each pallet is preferably large enough to hold a plurality of cylinders. The precise dimensions of the walkway, and of the pallets themselves, are not critical and can be varied within the scope of the invention.

The network of beams and crossbeams is provided with a plurality of dividers 49 which project upward from the network. The dividers 49 define spaces into which the pallets 9 can be inserted, and provide separation between adjacent pallets. FIG. 1 shows four sets of dividers 49 disposed along the length of the network, thereby providing space for two rows of five pallets each. Other spacing arrangements can be used, depending on the truck size and the width of the pallets.

The pallet 9 comprises a base portion 15, the base having a metal grid construction of a type similar to that of walkway 25. The metal grid of the base 15 must be of sufficient strength to support a plurality of cylinders 11, as shown. The mesh size of the grid of base 15 can be the same as that of the walkway, but it can also be of a different size. The base 15 of the pallet 9 is of sufficient height such that the surface on which the cylinders rest is substantially level with the surface of thw walkway 25.

Pallet 9 also comprises side plates 17 and end bars 19 which, together with strap 13, define a substantially rectangular enclosure for the cylinders 11.

Walkway 25 defines a flange 31 which extends along substantially the entire length of the walkway. Flange 31 is adapted for engagement with front tab 39 of pallet 9, so as to hold the pallet in place during its transportation. The details of the engagement of the flange and the tab will be more clearly described below.

Truck 1 is also provided with side rails 21, which are adapted to pivot around hinges 23. One of the side rails 23 is shown in its "down" or open position, while the remaining side rails are shown in the "up" or closed position. Rail flange 43 is visible on the side rail which is "down". Flange 43 is adapted for engagement with tabs on the rear side of the pallet; the details of the engagement will be more fully explained below.

Although the particular type of vehicle used with the present invention is not critical, it is a feature of the invention that the vehicle does not have a conventional bed. Instead, the bases of the pallets and the surface of the walkway together define the bed of the vehicle. Thus, the invention eliminates the need for a heavy truck bed for supporting the pallets. The weight of the vehicle is thereby substantially reduced.

Figure 6:
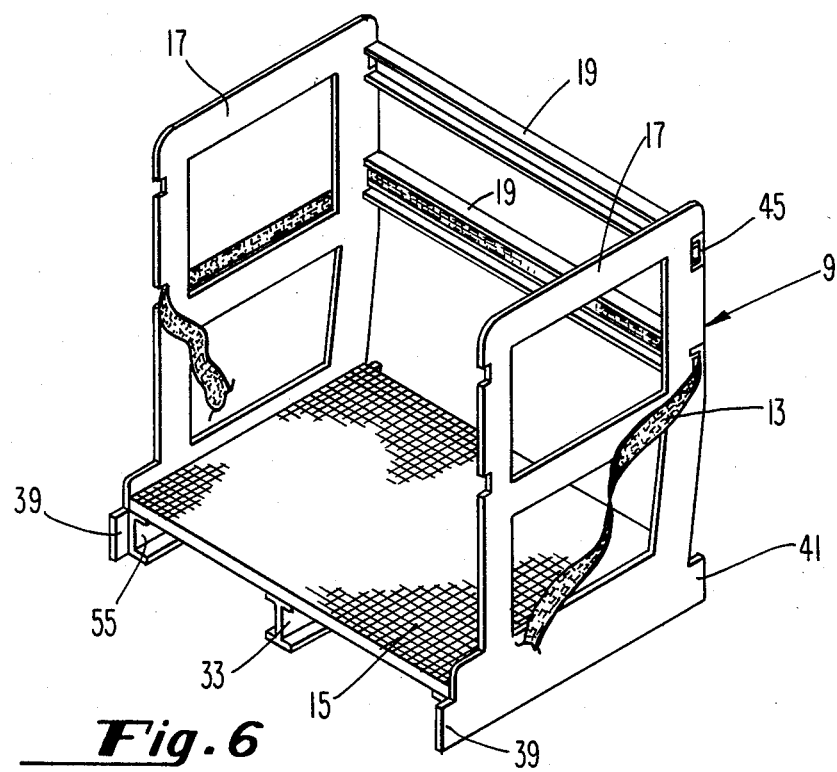
FIG. 6 is a perspective view showing an empty pallet, suitable for use with the present invention.

The construction of the pallet 9 is shown in the perspective view of FIG. 6. The figure shows an empty pallet, having base 15, side plates 17, and end bars 19. Strap 13 is shown hanging loose from the pallet. Each pallet is designed to accommodate two straps, which are fitted through strap slots 45, but only one strap is illustrated, for the sake of clarity. The base of the pallet is formed in part by I-beam 33 and two C-beams, only one of which is visible in the figure, the C-beam being designated by reference numeral 55. The side plates 17 and end bars 19 together define a substantially rectangular enclosure which is open at one side, for loading and unloading of individual cylinders from the pallet. The open side will be referred to throughout as the front of the pallet, and the side defined by end bars 19 is designated as the rear of the pallet. The construction of the base is sufficiently open to allow a fork member (not shown) of a conventional fork lift vehicle (also not shown) to be inserted under the pallet, so as to lift and transport the pallet.

Front tabs 39 and rear tabs 41 (only one of which is visible in FIG. 6) facilitate engagement of the pallet within the system, as will be described in detail later.

Further details of the present invention are illustrated in the top view of FIG. 2 and the side view of FIG. 3. In FIG. 2, the metal grid of walkway 25 is shown in partially fragmentary form. The side rails 21 are all in the "up" position, and the single pallet 9 is also illustrated. FIG. 2 also clearly shows dividers 49, defining the spaces into which the pallets can be loaded. FIG. 3 shows the rear end of pallet 9, defined by end bars 19, the cylinders 11 also being visible. Also visible in FIG. 3 are locking bars 35 for securing side rails 21 to posts 61. FIG. 3 also provides a partial view of the I-beam 33 which is part of the base of the pallet 9.

Figure 4:
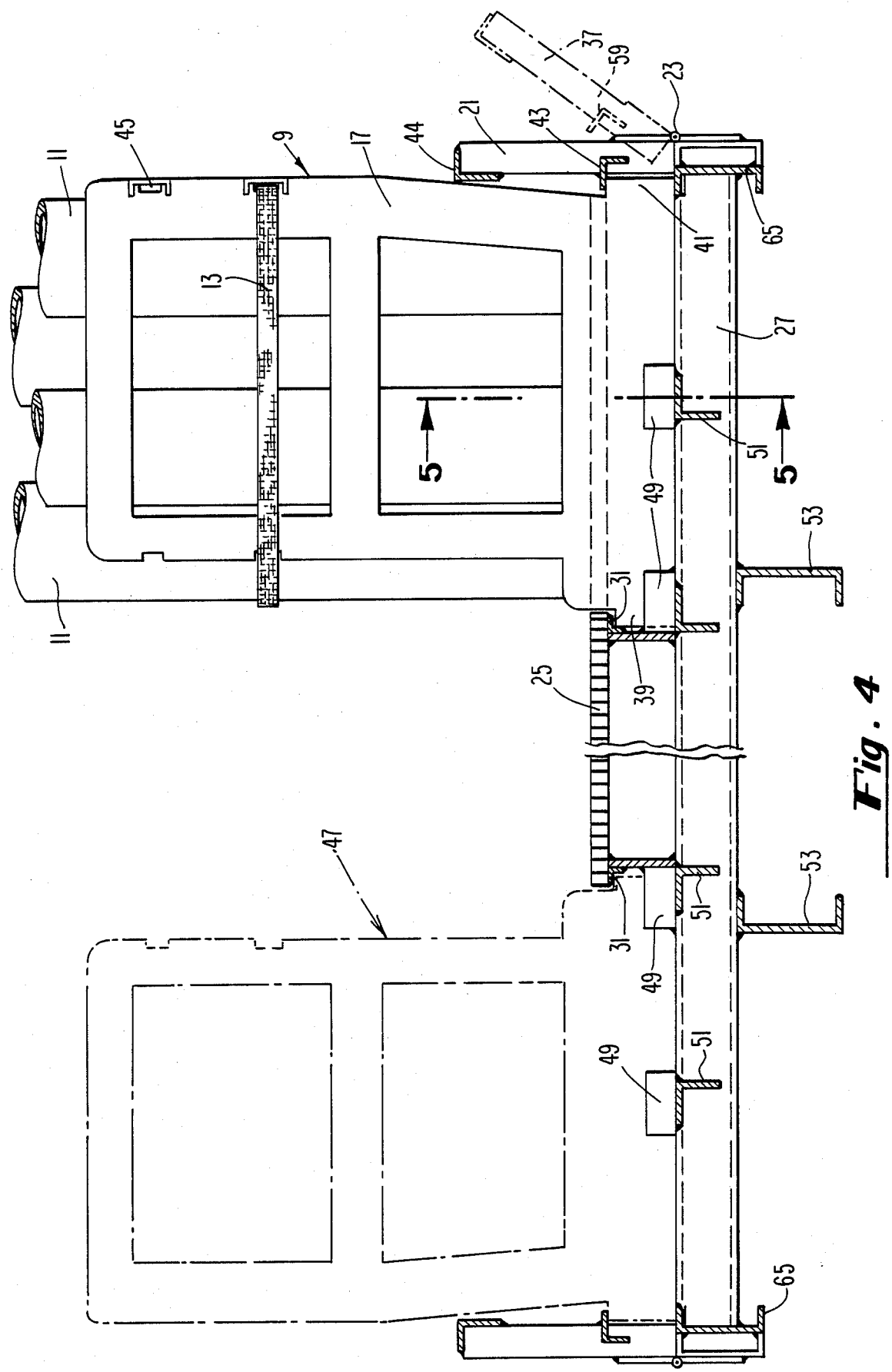
FIG. 4 is a cross-sectional view, taken along the line 4—4 of FIG. 2.

FIG. 4, a cross-sectional view taken along the line 4—4 of FIG. 2, shows the details of engagement of the pallets within the system. FIG. 4 shows pallet 9, as well as another pallet 47, shown in phantom for the sake of illustration, the pallet 47 being of substantially identical construction to that of pallet 9. As shown in FIG. 4, pallet 9 has a pair of front tabs 39 (only one of which is visible on pallet 9, in the view of FIG. 4), the tabs being shaped so that the pallet can be engaged by flange 31 of walkway 25.

The pallet also has a pair of rear tabs 41 (only one of which is visible in the figure) which are adapted for engagement with flange 43 of side rail 21. The side rail is also shown being pivoted around hinge 23, as indicated by the phantom drawing designated by reference numeral 37. The tilted version of flange 43 is indicated in phantom and identified by reference numeral 59. Dotted line 63 indicates the level of the top surface of the base 15 of the pallet, and it is therefore clear that the base of the pallet is substantially level with the surface of walkway 25.

FIG. 4 also shows corner piece 44 of side rail 21, which abuts the pallet when the side rail is in the "up" position. Also visible in FIG. 4 are angles 51 which are used to join the sections of the longitudinal beams 29 to the crossbeams 27. Longitudinal support members 53, also visible in FIG. 1, are also shown. The dividers 49 can be welded to the beams or the crossbeams, or can be attached by other means. Also visible in the figure are outer longitudinal beams 65.

Figure 5:
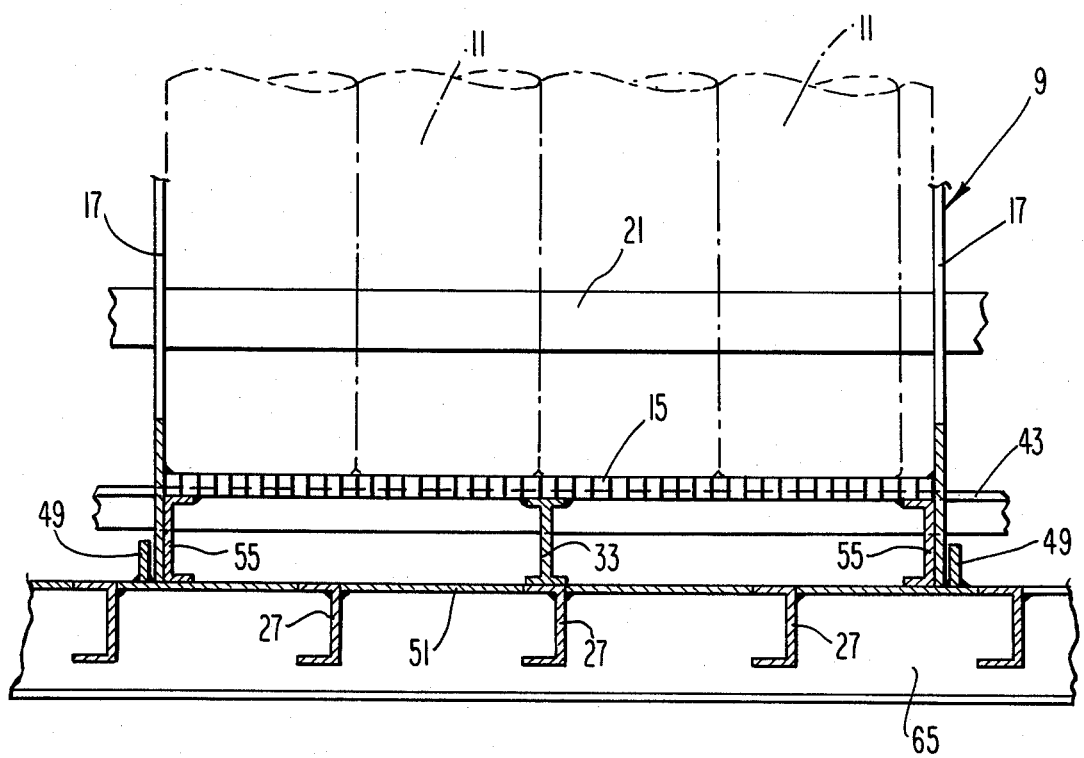
FIG. 5 is a cross-sectional view, taken along the line 5—5 of FIG. 4.

Further details of construction of the pallet are illustrated in the cross-sectional view of FIG. 5, taken along the line 5—5 of FIG. 4. Base 15 of pallet 9 is clearly shown, together with I-beam 33 and C-beams 55. Also visible is a side rail 21, and the flange 43 of the rail, in engagement with the rear tab 41 (not directly shown in FIG. 5) of the pallet. FIG. 5 more clearly shows the pallet 9 resting within the space defined by adjacent dividers 49. Angles 51, crossbeams 27, and end beams 65 are also shown.

As can best be seen in FIG. 1, with reference to the side rail 21 which is in the "down" position, flange 43 of the side rail does not extend along the entire length of the side rail, but is interrupted by posts 61 and by the vertical members of the side rails themselves. Thus, it is possible that not every rear tab 41 of each pallet 9 will be engaged by a flange 43 of a side rail. However, at least one of the rear tabs will, in general, be so engaged. Since both of the front tabs 39 will always be engaged by flange 31 of walkway 25, the latter flange extending along substantially the entire length of the walkway, at least three of the four tabs on each pallet will be engaged. Engagement by three of four tabs is sufficient to hold the pallet securely on the truck.

The construction of the pallet described above allows many different kinds of pallets to be used with the present system. The only requirements for the pallet are that the pallet fit within the space between the walkway and the side rail, and that the pallet have front and rear tabs to enable engagement and anchoring of the pallet as described above. The particular structure of the side walls of the pallet, or of the other features of its base, can be varied, while still being usable with this invention. The disclosed structure thus has an inherent flexibility not present with systems of the prior art.

The operation of the invention will now be described. In the initial loading phase, each pallet is first loaded with gas cylinders of the desired type. As stated above, unless a certain customer has ordered a pallet load of cylinders of a particular mix of gases, it is preferable that each pallet be loaded with cylinders of only one kind of gas. The cylinders are secured in their pallets by tightening the one or two straps on each pallet. With the side rails 21 of the truck in the "down" position, the pallets are then loaded onto the crossbeam network by a conventional fork lift truck (not shown in the figures). The fork lift vehicle operator pushes the pallet forward, as far as the pallet will go, and the front tabs of the pallet will thereby engage the flange of the walkway. When the side rails of the truck are raised and secured, at least one rear tab of each pallet will be automatically engaged, and the pallets are thereby firmly anchored on the truck.

The cylinders can later be unloaded from the truck in two ways. The first alternative is to remove entire pallets of cylinders from the truck. The side rails are simply lowered, and a fork lift vehicle is used to remove the pallets from the sides of the truck, in the conventional manner. The second alternative, which is used if it is necessary to retrieve only a small number of cylinders, or a small number of several different types cylinders, is as follows. First, the tailgate 7 of the truck is lowered. The operator of the system walks onto walkway 25, and walks to the pallet containing cylinders of the desired type of gas. An individual cylinder can be readily removed by unfastening the strap, and rolling a cylinder along the walkway, and onto the tailgate. Because each pallet contains only cylinders of one type of gas, it is not necessary to hunt for the desired cylinder. The cylinder nearest to the front end of the pallet may be taken and rolled along the walkway. The strap is then fastened again, securing the remaining cylinders in the pallet. The process is repeated for each different type of gas needed.

Use of the system of the present invention therefore saves considerable time in the loading and unloading of cylinders. The cylinders may be loaded or unloaded in complete pallets, or may be handled one at a time. In the latter case, no time is wasted in searching for a cylinder of the desired type of gas, because the walkway on the truck defines a center aisle, which makes all the cylinders readily accessible. No time is spent in moving some cylinders in order to gain access to others because the desired cylinder in each pallet is always the cylinder which is closest to the center aisle.

The objects of the invention are clearly fulfilled by the above disclosure. It is understood, however, that the invention can be modified in various ways within the scope of the disclosure. The particular number of pallets, the mesh size of the network of beams and crossbeams, and the shape of the side plates or the end bars of the pallets are examples of features which may be changed. The particular construction of the side rails and the tailgate of the truck could also be modified. The invention is therefore not limited to the precise embodiments disclosed. Variations such as those discussed above, and others, are to be deemed within the spirit and scope of the following claims.

What is claimed is:

1. A palletized cylinder distribution system, comprising:
   (a) a generally flat network of members and cross members, the network being attached to an automotive means, the network defining the load-carrying surface of the automotive means,
   (b) a walkway, disposed on the network, and raised therefrom, the walkway dividing the network into at least two regions, the walkway defining a flange,
   (c) a side rail, disposed at an end of the network, the side rail including a flange, and
   (d) at least two pallets, the pallets being generally open on one side, the open side being the side adjacent the walkway, each of the pallets having a base, the pallets being adapted to hold at least two gas cylinders on a surface defined by the base, the pallets having tabs adapted for engagement with the flange on the walkway and the flange on the side rail, the base of the pallets being of sufficient height that the surface of the pallets on which the cylinders rest is substantially level with the walkway, wherein the pallets and the walkway together define a bed for said automotive means, and wherein the walkway is distinct from any of the pallets.

2. The system of claim 1, wherein the base of the pallet is adapted for engagement with a lift member of a fork lift vehicle.

3. The system of claim 2, further comprising a plurality of divider means disposed on the network of cross members, the divider means defining spaces for insertion of pallets on the network.

4. Apparatus for transportation and distribution of a plurality of gas cylinders, comprising:
   (a) at least two pallets, each of the pallets having a base, each of the pallets being capable of holding at least two gas cylinders on a surface defined by the base, and
   (b) a network of cross members, the network comprising support means for the pallets, the network being affixed to a vehicle,
   (c) the network defining a path which is raised relative to the remaindero f the network, the network being capable of holding pallets on both sides of the path, the path being distinct from any of the pallets,
   (d) the pallets being open on one side, the open side being adjacent the path,
   (e) the base of the pallets being of sufficient height that the surface of the pallets, on which the cylinders rest, is substantially level with the path.

5. Apparatus for transportation and distribution of a plurality of gas cylinders, comprising:
   (a) at least two pallets, each of the pallets having a base, each of the pallets being capable of holding at least two gas cylinders on a surface defined by the base, and
   (b) a network of cross members, the network comprising support means for the pallets, the network being affixed to a vehicle,
   (c) the network defining a path which is raised relative to the remainder of the network, the network being capable of holding pallets on both sides of the path, the path being distinct from any of the pallets,
   (d) the pallets being open on one side, the open side being adjacent the path,
   (e) the base of the pallets being of sufficient height that the surface of the pallets, on which the cylinders rest, is substantially level with the path,
   (f) the path including flange means for affixing the pallets to the network,
   (g) wherein the base of each of the pallets is adapted to receive a fork member of a fork lift vehicle, whereby the pallet can be loaded and unloaded from the apparatus.

* * * * *